Sept. 15, 1931.　　　A. R. KRAUSE　　　1,823,611
TIRE TREAD CUTTING MACHINE
Filed July 17, 1930　　　8 Sheets-Sheet 3

Inventor:
Arnold R. Krause
by: Charles H. Seem Attys.

Sept. 15, 1931.                A. R. KRAUSE                 1,823,611
                        TIRE TREAD CUTTING MACHINE
                    Filed July 17, 1930     8 Sheets-Sheet 4
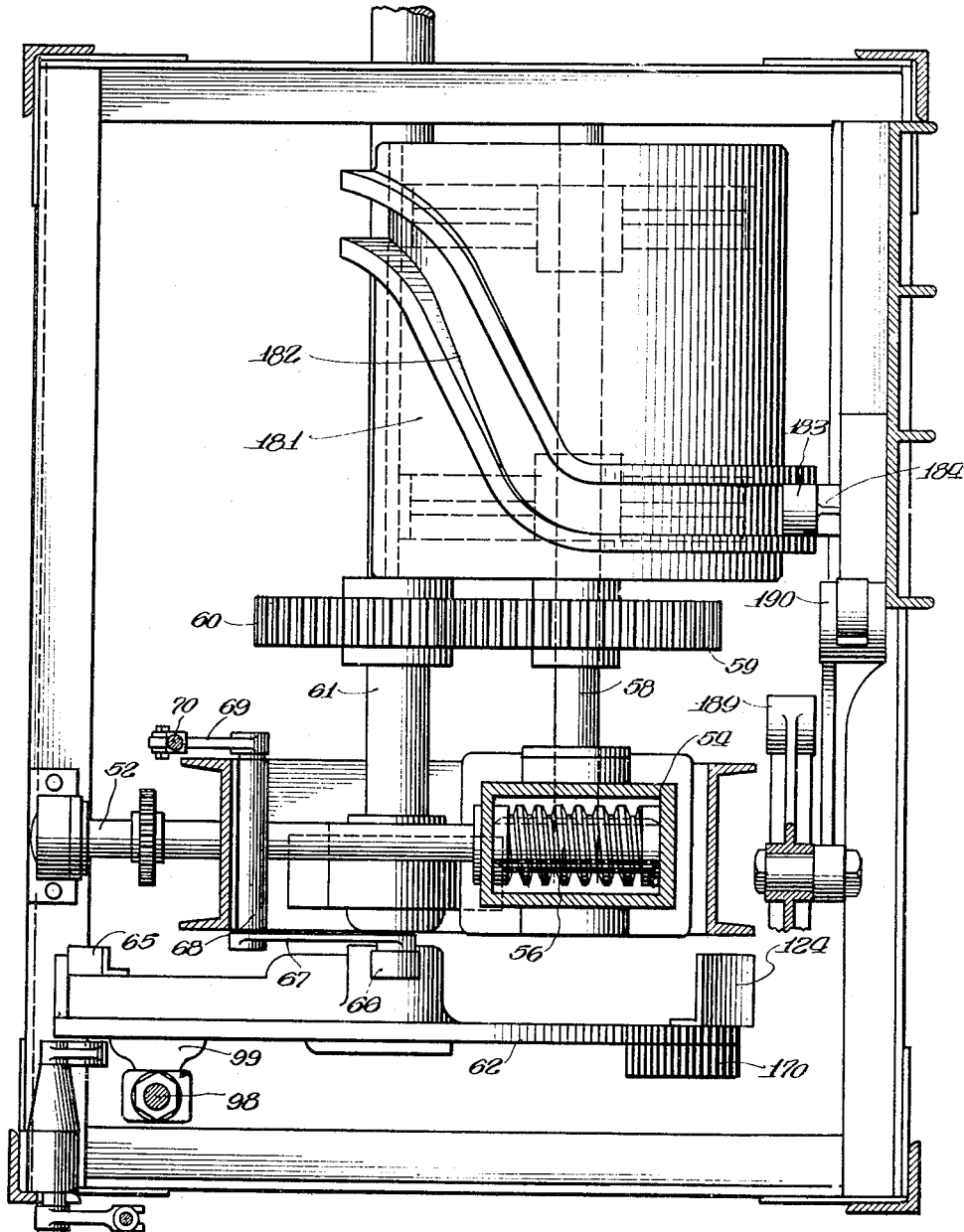

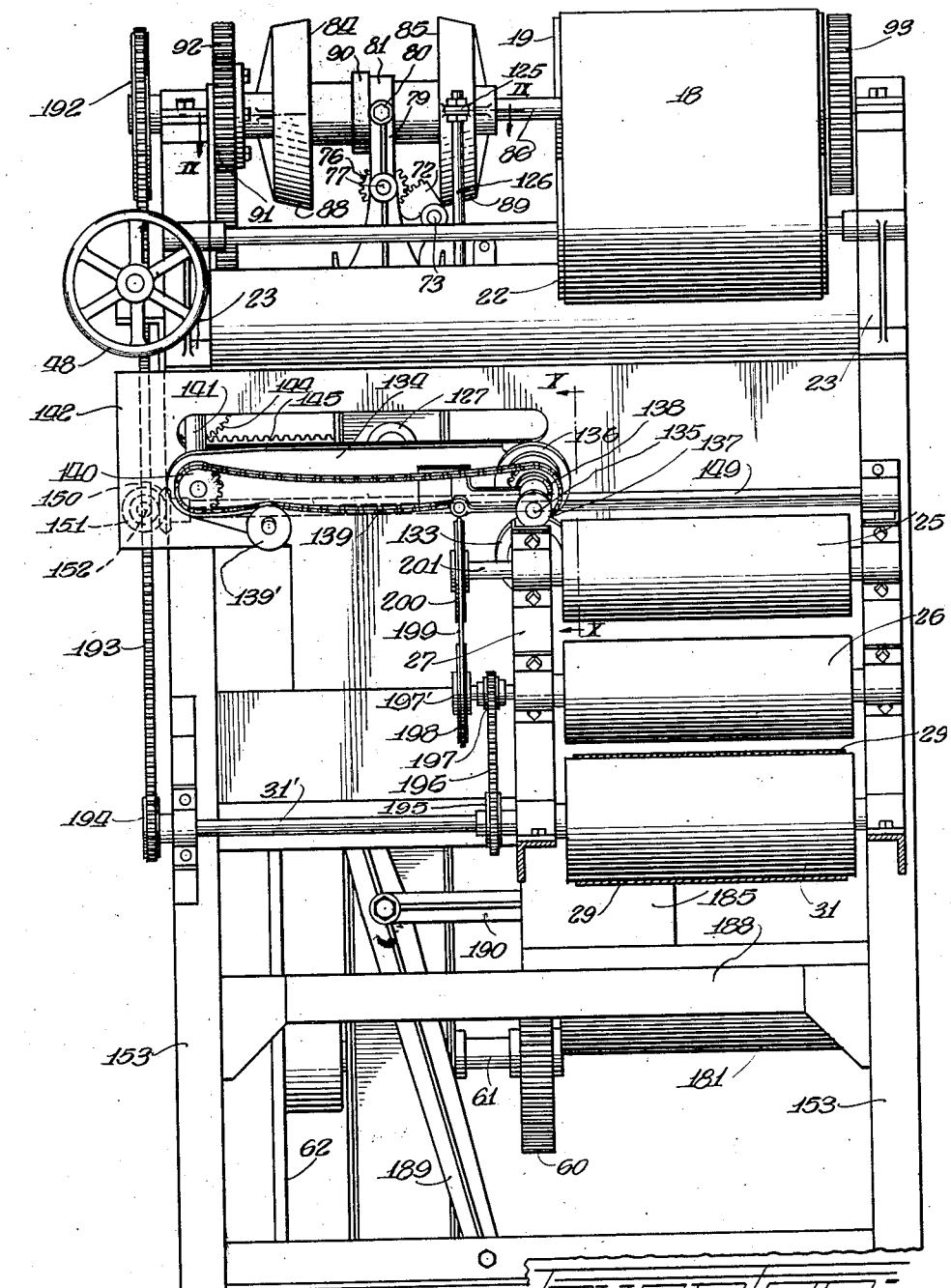

Sept. 15, 1931.  A. R. KRAUSE  1,823,611
TIRE TREAD CUTTING MACHINE
Filed July 17, 1930  8 Sheets-Sheet 6
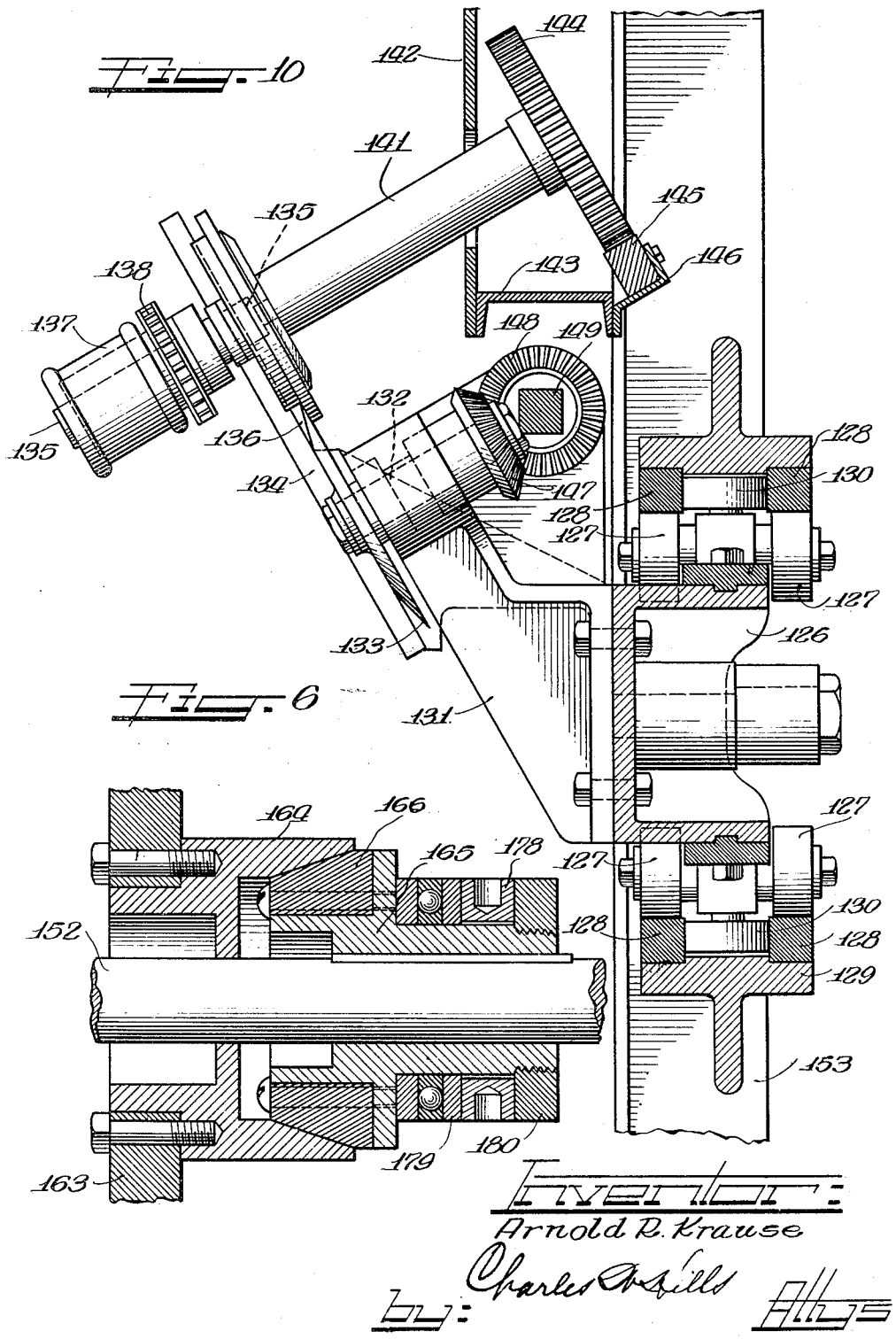
Inventor:
Arnold R. Krause
by: Charles A. Sills
Attys Sept. 15, 1931.   A. R. KRAUSE   1,823,611
TIRE TREAD CUTTING MACHINE
Filed July 17, 1930   8 Sheets-Sheet 7
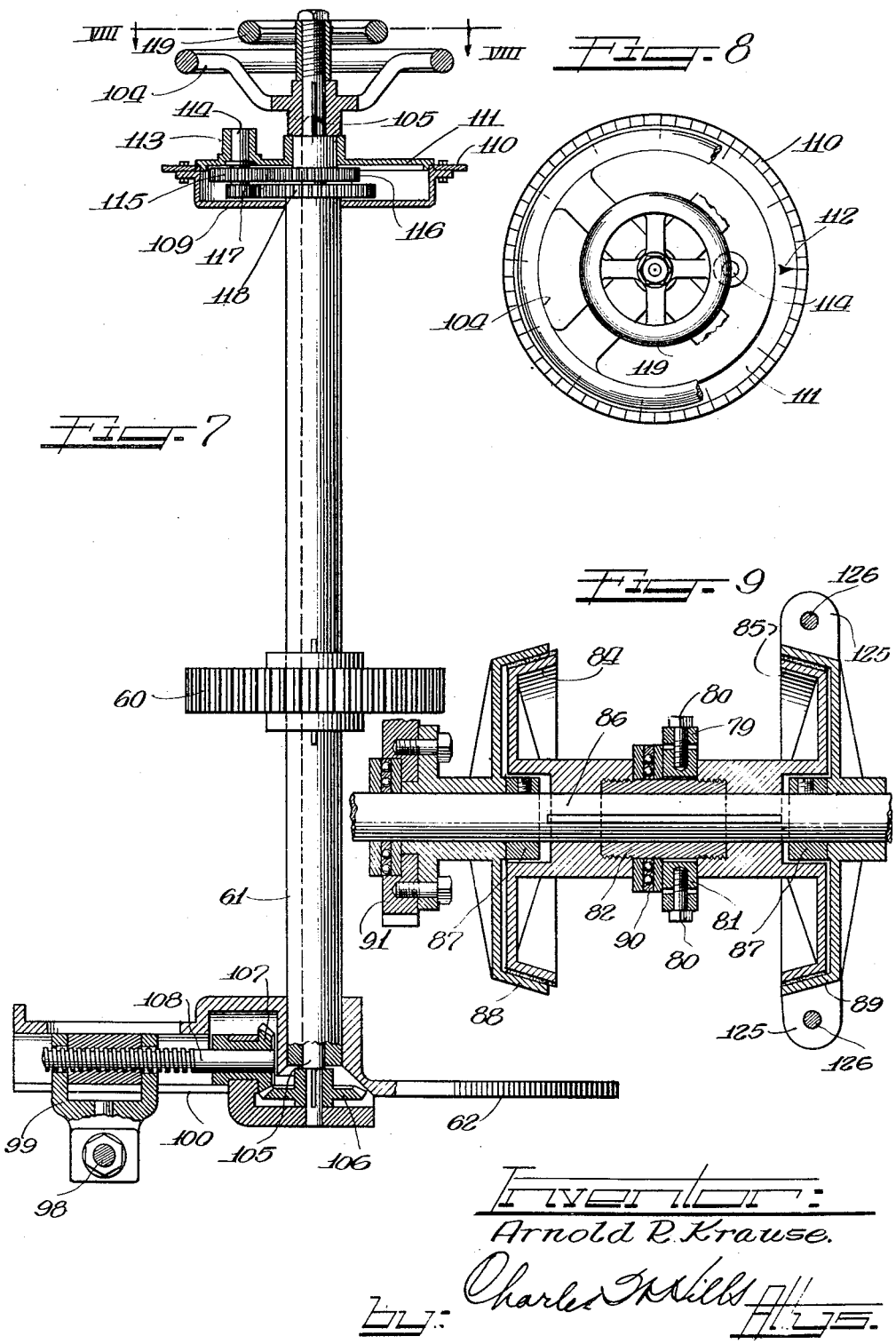

Sept. 15, 1931.   A. R. KRAUSE   1,823,611
TIRE TREAD CUTTING MACHINE
Filed July 17, 1930   8 Sheets-Sheet 8

Patented Sept. 15, 1931

1,823,611

UNITED STATES PATENT OFFICE

ARNOLD R. KRAUSE, OF EAU CLAIRE, WISCONSIN, ASSIGNOR TO GILLETTE RUBBER COMPANY, OF EAU CLAIRE, WISCONSIN, A CORPORATION OF WISCONSIN

TIRE TREAD CUTTING MACHINE

Application filed July 17, 1930. Serial No. 468,502.

This invention relates to an improved tread measuring and cutting machine arranged to cut measured lengths of stock from a continuous length of material.

An important object of this invention is to provide a tread measuring and cutting machine having improved cutting mechanism wherein the cutters thereof are independently and intermittently rotated in synchronism, while the cutting mechanism is being traversely actuated across the stock for continuously shearing predetermined lengths of material therefrom.

Another object of this invention is to provide an improved tread measuring and cutting machine having a novel clutch mechanism operable as a clutch during the stock feeding period and movable for braking the feeding mechanism during the cutting stroke of the machine.

A still further object of this invention is to provide an improved machine of the character described having adjustable feeding mechanism provided with means for accurately indicating the predetermined length of strips the machine is set to cut from a continuous length of tread material.

In accordance with the general features of this invention, there is provided a tire tread measuring and cutting machine of the character described in the patent of Alfred C. Hirch and Arnold R. Krause, Serial No. 182,705, filed April 11, 1927, Patent No. 1,744,224, pertaining to tread-cutting machines, but which differs primarily from the patented machine in that circular cutters are intermittently rotated independently of each other as the cutting mechanism is traversely actuated in synchronism with the feeding mechanism.

Another feature of this invention resides in the provision of an improved machine for the purpose described having a feeding rack, a unitary feed clutch and brake mechanism, and a clutch-operated cutter rotating mechanism actuated from a common crank.

Another feature of this invention relates to the provision of an improved machine for the purpose described having an intermittently moving cutter traversing mechanism actuated from a barrel cam.

Other objects and advantages of this invention will more fully appear from the following detail description taken in connection with the accompanying drawings, which illustrate a single embodiment thereof, and in which:

Figure 4 is an enlarged section taken on the line IV—IV of Figure 2, showing a plan view of the barrel cam and crank mechanism;

Figure 5 is a fragmentary front elevation illustrating the delivery end of the machine with the traverse cutting mechanism in its inoperative position;

Figure 6 is an enlarged fragmentary section taken substantially on the line VI—VI of Figure 1 illustrating the clutch mechanism for rotating the lower cutter;

Figure 7 is an enlarged section partly in elevation taken substantially on the line VII—VII of Figure 1, showing the adjusting mechanism for varying the travel of the feeding means;

Figure 8 is an enlarged partly fragmentary view of the feed adjusting hand wheel taken substantially on the line VIII—VIII of Figure 7;

Figure 9 is an enlarged sectional view of the feed clutch and brake mechanism taken substantially on the line IX—IX of Figure 5;

Figure 10 is an enlarged section taken substantially on the line X—X of Figure 5, illustrating the cutting mechanism.

As shown on the drawings:

A substantially continuous length of tire tread stock 15 of the required width is delivered from a calender machine (not shown) over a conveyor belt 16 disposed about a pulley 17, which pulley is suitably journalled in the upper portion of the calender machine.

Figure 1:
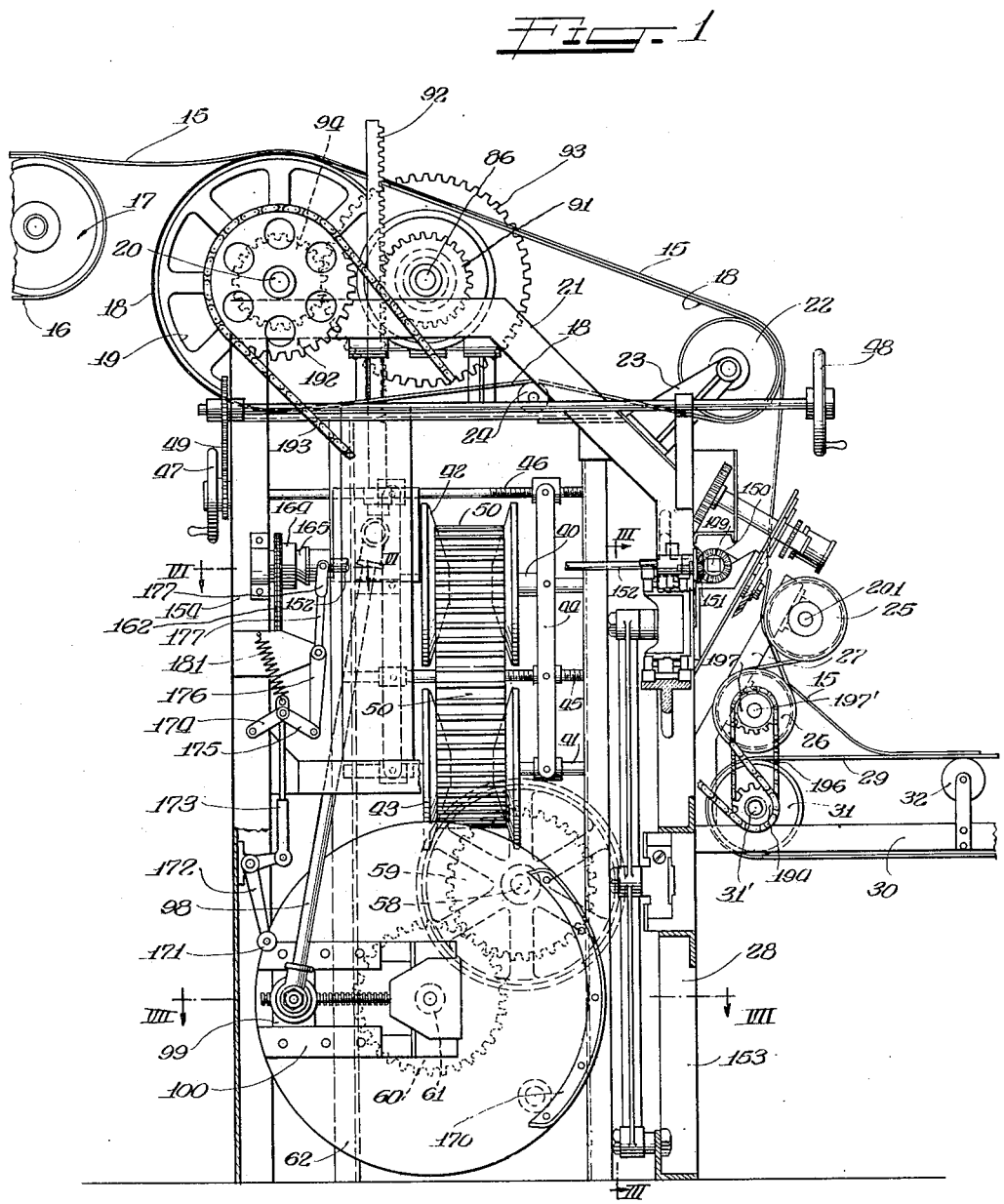
Figure 1 is a side elevation of the machine of this invention partly in section and with parts broken away.

The stock 15 is delivered to an endless feed belt 18, which runs about a drive pulley 19 mounted on a transverse shaft 20 journalled in the top horizontal part of the angular member 21 of the machine, and a roller 22 journalled in a pair of spaced brackets 23 secured to the inclined portions of the members 21 (Fig. 1). A roller 24 pivotally secured to the inclined bottom portion of the frame members 21 contacts with the lower part of the belt 18 for providing sufficient tension therefor.

The stock 15 is carried a predetermined distance by the belt 18 over rollers 19 and 22, and then moves down between a pair of inclined spaced rollers 25 and 26. The rollers 25 and 26 are suitably journalled on a pair of spaced inclined brackets 27 secured to front vertical supporting members 28 of the machine.

The end of the stock 15 is guided in its travel by the rollers 25 and 26 onto a belt 29 of a horizontal discharge conveyor, which conveyor is intermittently actuated for moving the stock away from the machine, after it has been cut into strips of predetermined length suitable to be formed into tires.

The conveyor comprises a frame member 30 having the inner ends thereof secured to the vertical supporting members 28. The outer ends of the frame members 30 (not shown) may be supported in any suitable manner. The frame members 30 have journalled thereon a drive shaft 31' which support a roller 31 for actuating the conveyor belt 29 disposed thereabout. The belt travels about a conventional idler roller (not shown) journalled to the outer end 30 of the conveyor (not shown). The upper portion of the belt 29 is supported by a plurality of spaced rollers 32, one of which is shown in Figure 1.

A motor 35 (Figure 11), connected to a suitable source of electrical energy, transmits power to a sprocket 36 keyed on the projecting end of a motor shaft 37. The sprocket 36 actuates a chain belt 38 for imparting rotary motion to a sprocket 39 secured on a shaft 40, which shaft is suitably journalled to the frame of the machine (Figures 2 and 11).

Figure 2:
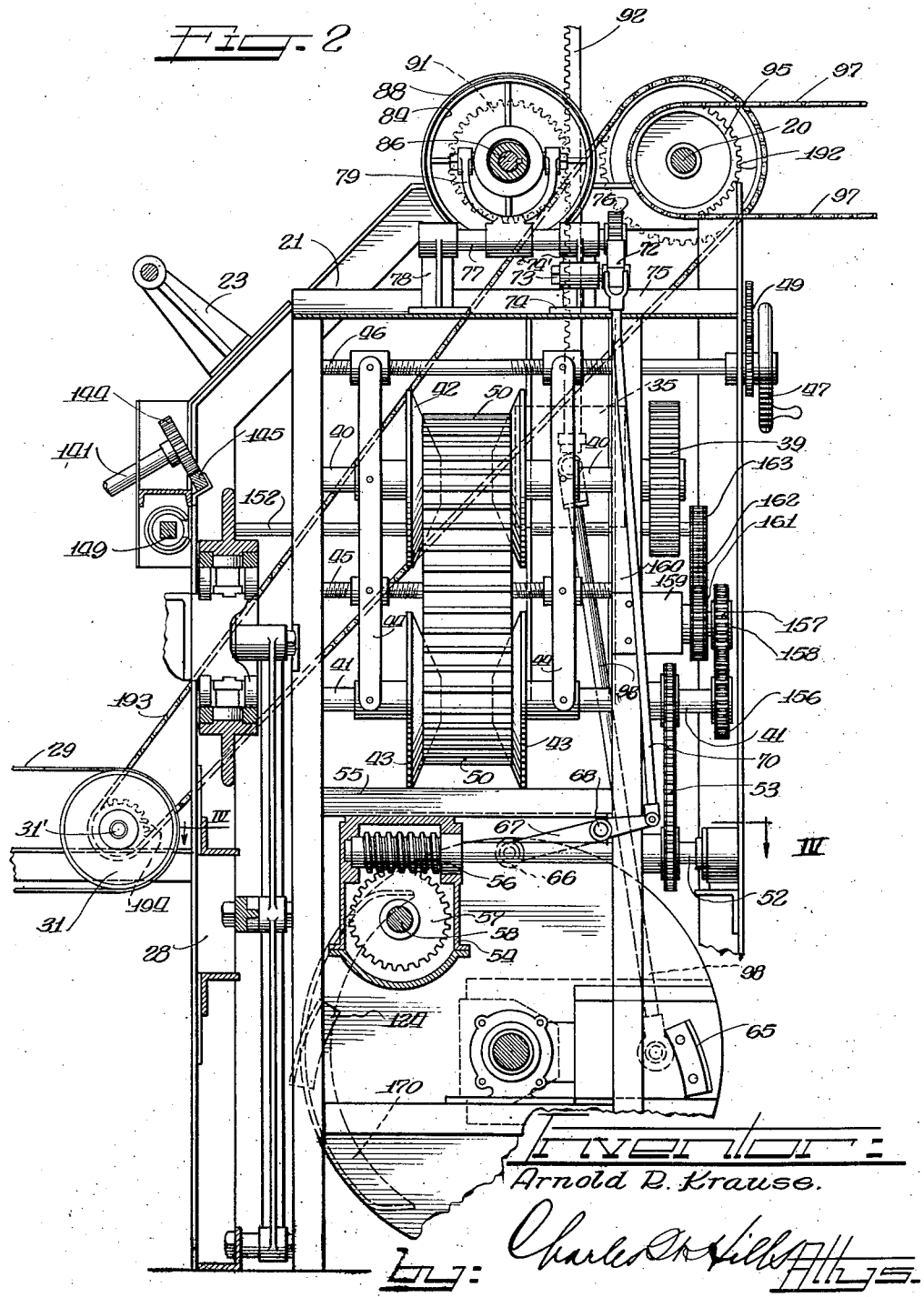
Figure 2 is substantially a reverse side elevation of the machine ilulstrated in Figure 1.

The shaft 40 actuates a parallel shaft 41 through a variable speed drive of the conventional type (Figures 1 and 2). The drive comprises two pairs of opposed conical pulleys 42 and 43 having sliding movement on the respective shafts 40 and 41. The hubs of one pulley of each pair are connected by a bar 44 on each side thereof, both bars being fulcrumed together midway between the two pairs of pulleys by an adjustable spacer bar 45. The projecting ends of the bars 44 carry nuts threaded on a right and left-hand screw shaft 46, which shaft is rotated from the rear of the machine by a hand wheel 47, or may be actuated from the front of the machine if desired by a hand wheel 48 through the chain drive mechanism 49. (Figures 1 and 2).

The turning of either of the hand wheels 47 or 48 moves one pair of pulleys together to the same extent that the other pair of pulleys are moved apart. The drive from the pulley 42 on the shaft 40 to the pulley 43 on the shaft 41 is by means of a belt 50 having the conventional blocks thereon. The ends of the blocks transmit the driving force and ride on the surface of the conical pulleys to vary the feeding speed according to the adjustment of the drive.

Figure 11:
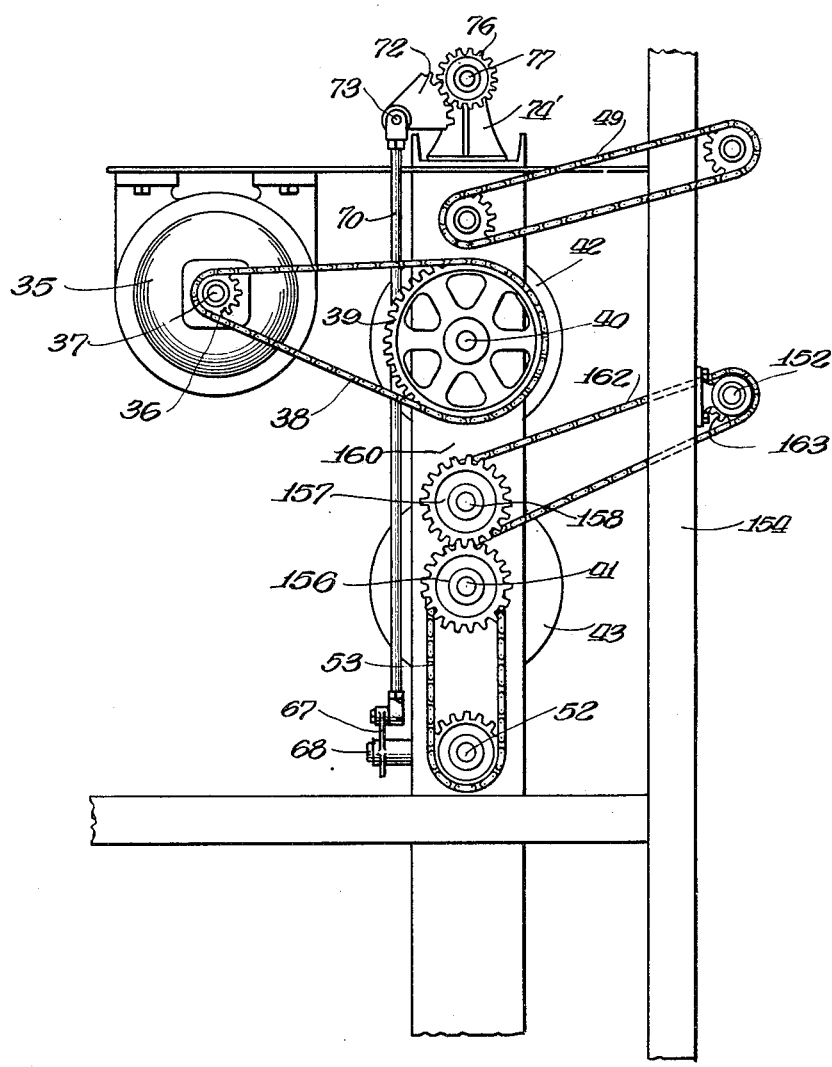
Figure 11 is an enlarged fragmentary rear elevation illustrating the motor and gear drive mechanism for the machine.

The driver shaft 41 rotates a parallel counter shaft 52 by means of a sprocket chain drive mechanism 53 connecting the respective shafts 41 and 52 (Fig. 11). Mounted on the inner end of the shaft 52 (Figures 2 and 4) inside a gear housing 54 secured to the transverse member 55 of the frame is a worm 56 which meshes with a worm gear 57 keyed on a shaft 58 for rotating a gear 59 also keyed on the shaft 58. The gear 59 meshes with a gear 60 secured on a hollow shaft 61 for imparting a rotary motion to a crank disc 62 secured on the outer end of the hollow shaft.

The disc 62 is provided with a projecting cam sector 65 (Figure 2), which sector during a part of the revolution of the disc contacts with a roller 66 of a lever arm 67 to upwardly pivot the lever arm to partially rotate a shaft 68 pivotally carried by the frame of the machine. The partial rotation of shaft 68 in a clockwise direction (Fig. 2) downwardly moves a connecting rod 70, which has its lower end pivotally connected to the outer end of lever arm 67.

The upper end of the connecting rod 70 (Figures 2 and 11), is connected to the arm of a mutilated gear sector 72 pivotally mounted on a stub shaft 73, which shaft is suitably journalled in a bearing bracket 74 secured to top transverse member 75 of the machine frame. The gear sector 72 meshes with a gear 76 secured on the outer end of a shaft 77, which shaft has one end journalled in the bracket 74', the other end thereof being journalled in a bearing bracket 78 secured to the frame member 75 in alignment with the bearing bracket 74'. Keyed on an intermediate portion of the shaft 77 is a clutch shifter fork 79 connected by studs 80 to a collar 81 loosely disposed about a bushing 82 that threadedly connects the inner ends of a pair of cone members 84 and 85 slidably keyed on a shaft 86, best illustrated in Figures 2, 9 and 11. The cone members 84 and 85 are leather lined on the outside peripheries thereof for frictionally engaging respective cone members 88 and 89 which are prevented from sliding inwardly on the shaft 86 by spaced collars 87 secured on the shaft 86.

The clutch or cone member 88 is rotatably disposed on the shaft 86. When the arm of the mutilated gear 72 is downwardly actuated by the connecting rod 70, the gear 76 meshing with the gear 72 will be actuated in a clockwise direction for rotating the shaft 77, which shifts the fork 79 against a thrust bearing 90 for slidably actuating the clutch member 84 into engagement with the clutch member 88. A gear 91 secured on the hub of the clutch 88 is actuated by the downward movement of a vertical rack 92 for rotating the cooperating clutch members 84 and 88 and the shaft 86. A gear 93 secured on the shaft 86 meshes with a gear 94 keyed on the shaft 20 (Fig. 1). The rotation of the shaft 20 actuates the machine feed belt 18 through the drive roller 19 for moving the tire stock 15 a predetermined distance over the idler roller 22 and permits the end of the stock to drop down between the rollers 25 and 26 onto the conveyor belt 29.

During the time the shaft 20 is actuating the machine feed belt 18, a sprocket gear 95 (Figure 2) secured on the shaft 20 is through the chain drive belt 97 rotating to roller 17 to move the feed belt 16 for feeding the stock from the calender machine.

The rack 92 is vertically reciprocated by the crank disc 62 through a connecting rod 98 having its upper end pivotally connected to the lower end of the rack, and its lower end connected to a crank block 99 disposed in a slide 100 in the outer face of the crank disc 62 (Figures 4 and 7). The angularity of the connecting rod 98 can be quickly and readily varied to actuate the rack 92 for feeding any desirable length of stock over the belt 18, by simply actuating a hand wheel 104 in the proper direction for rotating a shaft 105 disposed within the hollow shaft 61. The rotation of the shaft 105 actuates bevel gears 106 and 107 secured on the inner end thereof for rotating a threaded rod 108, which rod slides the crank block 99 inwardly or outwardly as desired from the center axis of the crank, for changing the angularity of the connecting rod 98.

The crank disc adjusting mechanism is provided with means for accurately indicating the length of the strip to be cut. The indicating means comprises a housing 109 secured on the hollow shaft 61. A gauge or indicating ring 110 is secured to the flanged portion of the housing. The gauge ring 110 is provided with indicational lines having suitable characters thereon corresponding to desirable lengths of tire tread stock to be cut. A cover 111 having its annular flanged portion projecting into the housing 109 is keyed on the adjusting shaft 105 for rotation therewith independent of the housing 109. An indicator finger 112 secured on the outer face of the cover 111 projects over the indicating ring 110 and has its tapered outer end in alignment with one of the indicational marks on the ring 110 designating the character corresponding to the length of the tire stock the machine is set to cut. The cover 111 is provided with an outwardly projecting apertured lug 113 for receiving a stub shaft 114, which shaft carries a gear 115 that meshes with a gear 116 keyed on adjustable shaft 105. Disposed on the inner end on the stub 114 is a pinion 117 that meshes with a gear 118 keyed on the hollow shaft 61.

The rotation of the hand wheel 104 keyed on the shaft 105 actuates the gears 115 and 116 so that the pinion 117 is revolved about the fixed gear 118 on the hollow shaft 61 and the cover 111 is simultaneously rotated in respect to the housing 109. The cover 111 is rotated until the indicating finger or pointer 112 secured thereon points to the indicia on the ring 110 indicating desired length of tire tread stock to be cut.

After the angularity of the crank disc connecting rod has been adjusted, a locking wheel 119 threaded on the outer end of the shaft 105 is rotated to inwardly slide the hand wheel 104 on the shaft 105 until the shoulder portion thereof engages the hub of the cover 110 to actuate the cover into frictional engagement with the housing 109, thereby locking the cover to the housing so that the indicating mechanism will thereafter rotate as a unit with the shaft 61.

When the tire tread stock has traveled on the feed belt of the machine the desired distance, the crank disc 62 will have rotated approximately one-half revolution, and a cam sector 124 (Figures 2 and 4) similar in construction to the cam sector 65, is so positioned on the crank disc that the inner arcuate surface of its projecting member will engage the roller 66 on the lever 77 for upwardly moving the connecting rod 70, thereby actuating the mutilated gear 72 and the gear 76 to pivotally rotate the shaft 77 in a counter-clockwise direction (Fig. 2).

The rotating of the shaft 77 in a counter-clockwise direction moves the shifter fork 79 to the right as viewed in Figure 9 for disengaging the clutch member 84 from the clutch member 88, to permit the clutch member 88 and gear 91 to rotate idly on the shaft 86. The movement of the shifter fork 79 to the right shifts the clutch member 85 into engagement with the fixed cone brake member 89, which latter cone member is provided with a plurality of lugs 125 (one of which is shown in Figure 5) fixedly connected to rods 126 secured to the frame of the machine. The actuation of clutch member 85 into engagement with the clutch member 89 permits the clutching mechanism to function as a brake for the feeding mechanism during the nonfeeding period of the machine.

Figure 3:
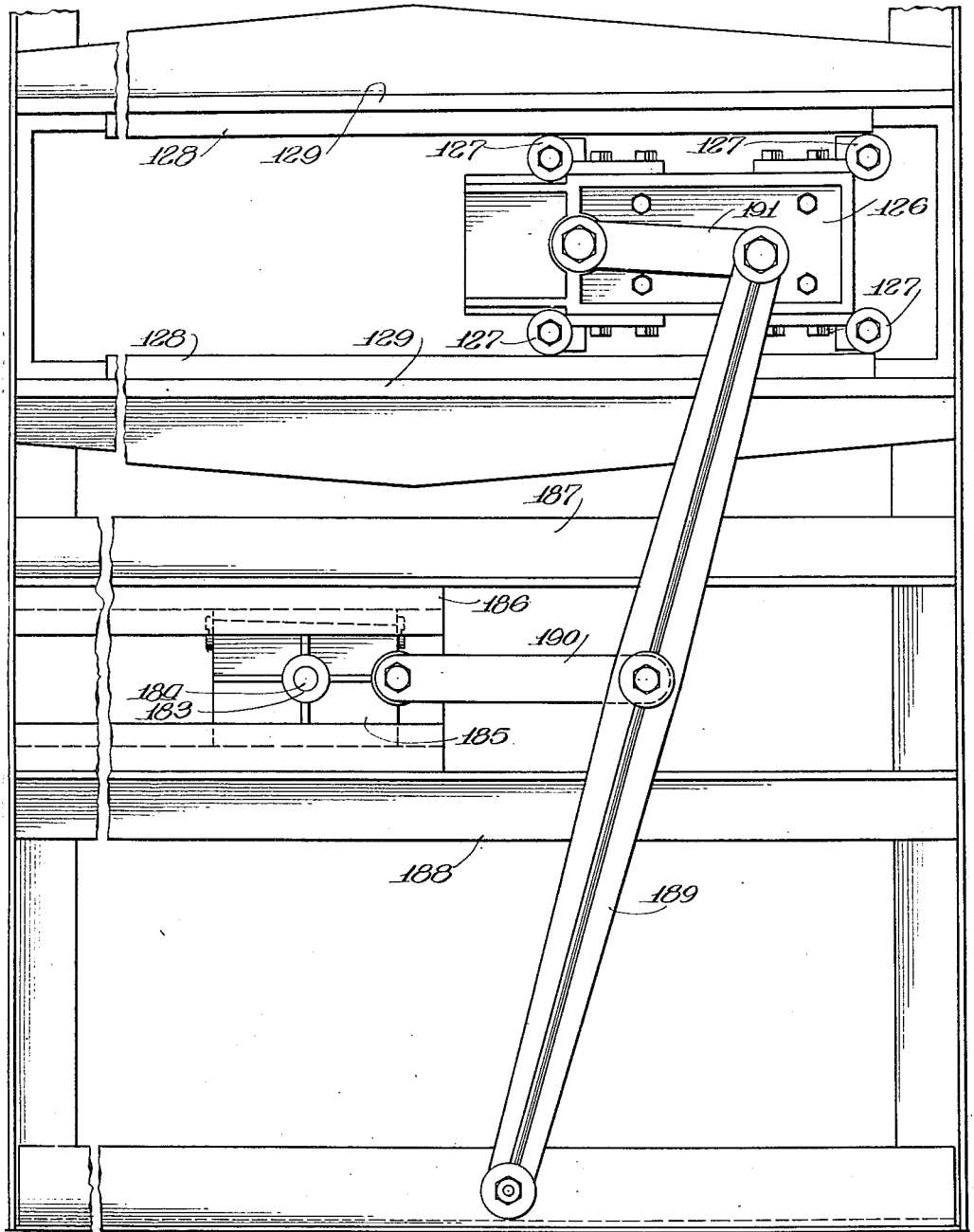
Figure 3 is a fragmentary section taken on the line III—III of Figure 1, illustrating the cutter slide and actuating lever therefor.

The cut-off mechanism comprises a traversing carriage 126 having upper and lower rollers 127 suitably journalled thereon, which rollers run on the respective upper and lower parallel guide bars 128 secured in a guideway 129 of the main frame of the machine (Figures 3 and 10). The carriage 126 has also journalled thereon upper and lower horizontal rollers 130 which run between the respective upper and lower guide bars 128.

The carriage 126 has bolted to a front portion thereof an angular cutter bracket 131, which bracket is apertured for receiving a shaft 132, that carries a lower cutter blade 133. Secured to the front inclined surface of the cutter bracket 131 is a cutter head bracket 134 supporting an inclined shaft 135, which shaft carries an upper cutter blade 136 (Figures 5 and 10). The bracket 134 is provided with a bearing portion 137 which supports the outer end of the shaft 135. The angular mounting of the cutter bracket maintains the cutters in proper position to produce the desired angle of scarf on the ends of the tread stock.

Keyed on the inclined shaft 135 adjacent the bearing members 137 is a sprocket 138, which is connected to a sprocket 140 by a chain 139. A roller 139′ contacts with the lower portion of the chain 139 for providing the proper tension for the chain. The sprocket wheel 140 is secured on an inclined shaft 141 suitably journalled to the outer end of the bracket 134. The shaft 141 projects through the elongated opening of a transverse plate 142, which plate is secured to a channel 143 fastened to the vertical front members 153 of the machine frame (Figures 5 and 10). A gear 144 keyed on the inner end of the shaft 141 engages the teeth of an inclined rack 145, which rack is bolted to an angle member 146 of the frame of the machine. The movement of the transverse cutter carriage to the right as viewed in Figure 5 actuates the gear 144 along the rack 145 for rotating the upper cutter during the machine cutting period.

The lower cutter 133 is rotated independently of the upper cutter by a bevel gear 147 keyed on the shaft 132 and an intermeshing bevel gear 148 rotatably supported by the bracket 131. The gear 148 is slidably positioned on a square shaft 149 to permit the cutter carriage 126 to transverse the machine for shearing the stock into desired length of tire tread strips. (Figures 5 and 10).

The end of the square shaft 149 (Figure 1) has secured thereon a sprocket wheel 150 meshing with a sprocket 151 keyed on the shaft 152, which shaft is journalled to the front and the rear vertical members 153 and 154, respectively of the machine frame. A gear 156 secured on the end of the speed adjustable drive shaft 41 meshes with the gear 157 keyed on a stub shaft 158 suitably journalled in a bracket 159 secured to the vertical frame member 160 of the machine (Figures 2 and 11). Keyed on the stub shaft 158 is a sprocket 161 that is connected by a chain 162 to a sprocket 163 secured on the hub of a clutch member 164 freely disposed on the shaft 152 (Figures 1 and 6). The shaft 152 actuates the lower cutter rotating mechanism by the shifting of a clutch member 165 slidably keyed on the shaft 152, so the leather tapered portion 166 thereof frictionally engages the tapered inner portion of a rotating clutch member 164.

The clutch member 165 is actuated into engagement with the clutch member 164 during the cutting period of the machine by the crank disc 62 which carries a cam segment 170 that engages a roller 171 for outwardly pivoting a bell crank lever 172 secured to the vertical frame member 154. The lever 172 downwardly actuates a connecting rod 173 and lever arms 174 and 175 for outwardly pivoting a lever arm 176. The lever arm 176 pivotally actuates the clutch shift fork 177 pivoted to a collar 178 for sliding the clutch member 165 into engagement with the clutch member 164. Disposed about the hub portion of clutch member 165 between the shoulder portion thereof and the collar 178 is a thrust ball bearing member 179 of the conventional type well known to those versed in the art. The collar 178 and ball bearing member 179 are held on the clutch member 165 by a collar 180 threadably connected on the end thereof.

Upon completion of the cutting operation the cam segment 170 will move out of engagement with the roller 171, permitting a spring 181 attached to the upper end of the connecting rod 173 to actuate clutch shifter fork 177 to the right as viewed in Figures 1 and 6 for moving the clutch member 165 out of cooperation with the clutch member 164, thus preventing rotation of the lower cutter 133 during the feeding period of the machine.

The cutter carriage 126 is intermittently actuated in time relationship with the feeding mechanism by a barrel cam 181 rotated from the drive shaft 58 (Figure 4). The barrel cam 181 is provided with the roller guideway 182 for guiding a roller 183 mounted on a stud 184 secured to a cam block 185. The cam block is slidably positioned in a guide 186 secured to members 187 and 188 of the machine frame (Figure 3).

The cam block 185 is connected to a cutter head link 189 by means of a cam slide connecting link 190. The lower end of the link 189 is pivotally connected to the lower transverse frame member of the machine, and the upper end of the link is connected to the cutter carriage 126 by means of a cutter head link 191.

The barrel cam guideway 182 is so designed that during one-half revolution of the cam the roller 183 follows the guideway for advancing the carriage across the stock during the shearing period and retracting the carriage to its normal position after the stock has been sheared. During the remaining half revolution the dwell in the guideway 182 of the cam maintains the cutter carriage in its normal or inoperative position while the machine feeding mechanism is being actuated for feeding the stock.

The discharge conveyor belt 29 is actuated from the feed conveyor shaft 20 by a sprocket 192 keyed thereon, which sprocket is connected by a chain 193 to a sprocket 194 keyed on conveyor drive shaft 31' (Figures 1 and 2). The sprocket 194 is smaller than the sprocket 193 for driving the discharge belt 29 at a faster speed during the feeding and discharge period than the feed belt 18 (Figures 1, 2 and 5). Also secured on drive shaft 31' is a sprocket 195 that is connected by a chain drive 196 to a sprocket 197 keyed on the shaft 197' which carries the roller 26 (Fig. 5). A pulley 198 keyed on the end of the shaft 197' is connected by a cross belt 199 to a pulley 200 keyed on a shaft 201 which carries the roller 25, thus the rollers 25 and 26 are oppositely rotated during the feeding period of the machine.

The operation of tire tread measuring and cutting machine is briefly as follows:

A substantially continuous length of tire tread stock 15 of the required width is delivered from any suitable source such as a calender machine (not shown) to the feed belt 16 (Figure 1). The stock 15 is delivered from the belt 16 to the machine feed belt 18 where it travels over the drive roller 19 and the idler roller 22, dropping down between the guide rollers 25 and 26 onto the discharge conveyor belt 29.

The motor 35 transmits power through the sprockets 36 and 39 to the variable speed drive mechanism of the conventional type known to those versed in the art. The variable speed drive (Figure 2) actuates the shaft 41 for transmitting rotation to the parallel shaft 52 through the chain drive mechanisms 53. The shaft 52 rotates a transverse shaft 58 at a reduced speed through the worm 56 and the worm gear 57. The shaft 58 through the intermeshing gears 59 and 60 actuates the shaft 61 for rotating the crank disc 62 (Figure 4), which disc reciprocates the connecting rod 98 for moving the vertical rack 92 that rotates the gear 91 and the clutch member 88 loosely disposed on the shaft 86 (Figures 2, 5 and 9).

The rack 92 is downwardly actuated for rotating the gear 91 and the clutch member 88 in clockwise direction (Figure 2), at the same time the cam sector 65 on the crank disc 61 contacts with the rollers 66 for downwardly moving the connecting rod 79, which actuates the gear segment 72 and the gear 76 for rotating shaft 77. The shaft 77 pivotally moves the clutch fork 79 (Figure 9) for shifting the clutch member 84 into cooperation with the rotatable clutch member 88, thereby rotating the shaft 86, which rotates the feed belt drive pulley 19 through the intermeshing gears 93 and 94. The actuation of the drive pulley 19 in a clockwise direction (Figure 1) moves the feed belt 18 to the right for advancing stock 15 a predetermined distance past the shearing position, the stock passing between the rollers 25 and 26 and the end thereof to rest on the belt 29 of the discharge conveyor.

It is to be noted that the travel of the rack 92 which operates the feeding mechanism can be quickly and easily varied for permitting the feeding of a desirable length of stock on the conveyor, by simply unlocking the hand wheel 119 from locking engagement with the hand wheel 104 (Figure 7), thereafter rotating the hand wheel 104 for actuating the adjusting shaft 105 positioned within the hollow shaft 61. The shaft 105 actuates the intermeshing bevel gears 106 and 107 and the associated adjusting screw 108 for outwardly moving the connecting rod 98 to and away from the center axis of the crank disc 62 (Figures 1 and 7), thus increasing or decreasing the angularity of the connecting rod which controls the travel of the vertical rack 92.

The adjusting hand wheel 104 is rotated until the planetary gearing disposed within the housing 109 which is simultaneously actuated by the adjusting wheel rotates the cover 111, so that the pointer 112 secured thereon indicates the numeral on the housing gauge ring 110 corresponding to the desired length of strips which the machine is being set to cut. Thereafter the hand wheel 119 is brought into locking engagement with the adjusting wheel 104 for preventing further rotation of the adjusting wheel. Obviously, in this manner the feeding mechanism can be quickly and easily adjusted and accurately set for feeding desirable lengths of tire tread stock.

After the tire tread stock has been moved by the feed conveyor the desired distance the crank disc 62 will then be in position so that the arcuate inner projection portion of the cam sector 124 secured thereon engages roller 66 for actuating connecting rod 77, and the gears 72 and 76 to move the shifter fork 79 to the right (Figure 9), disengaging the clutch members 84 and 88, and thereby allowing the clutch member 88 and the gear 91 to be free on the shaft 86. The clutch fork 79 slides the clutch member 85 into engagement with the stationary brake member 89. Thereafter, clutch members 85 and 89 cooperate to function as a brake for preventing actuating of the feeding mechanism during the cutting period of the machine.

When the tire tread stock has moved the desired distance by the conveyor 18, and the feeding mechanism is idle, the barrel cam 181 actuates the connecting link 189 for traversing the carriage 126 across the stock allowing the rotatable cutters 133 and 136 mounted thereon to shear the stock on an angle thus providing a suitable scarf for the ends of the strips. The cam 181 is designed with a dwell or idle period during one-half of its revolution for maintaining the cutter carriage 126 in its normal position during the feeding period. The remaining half revolution of the cutter carriage is uniformly advanced and retracted across the machine.

It is to be observed that the cutters 133 and 136 are only rotated during the cutting period. The upper cutter is rotated by the gear 144 rolling over the rack 145, which actuates the shaft 141, the sprocket 140 and a sprocket chain 139 for rotating the sprocket 138 secured on the shaft 135, which shaft rotates the upper cutter.

The lower cutter 133 is independently rotated in timed relationship with the upper cutter during the traversing of the carriage mechanism across the stock in the following manner: The crank disc cam sector 170 engages the roller 171 for actuating the leverage mechanism connected to the shifter fork 178 (Figure 1). The shifter fork slidably moves the clutch member 165 into engagement with the rotatable clutch member 164. The clutch members cooperate to rotate the shaft 152.

The intermittent rotation of the shaft 152 actuates the transverse square shaft 149 through the bevel gears 151 and 150 secured on the respective shafts. When the traversing carriage 126 is advanced and retracted across the front of the machine, the bevel gear 148 journalled to the carriage bracket 131 and which is slidably disposed on the square shaft is moved along the shaft 149 and rotated thereby for actuating the bevel gear 147 secured on the cutter shaft 132, thereby rotating the cutter 133 in synchronism with the cutter 136 for shearing the stock as the cutter carriage is advanced across the material.

After the cutter carriage has been retracted to normal position, the spring 181 (Figure 1) upwardly actuates the connecting rod 173 for shifting the clutch fork 178 to disengage the clutch member 165 from the clutch member 164 so that the shaft 152, which actuates the lower cutter rotating mechanism will not be rotated during the feeding period of the machine. The upper cutter 136 which is actuated by the rack gear 144 rolling over the rack 145 during traverse movement of the cutter will also be idle during the feeding period of the machine.

As soon as the tire tread stock is cut into strips of the desired length, the strips are carried away from the cutting position by the discharge conveyor 29 (Figures 1 and 2), which conveyor is operated from the feed belt drive shaft 20 through the sprocket 192 and the chain 193 to smaller sprocket 194 secured on the shaft 31'. The shaft 31' actuates the discharge drive roller 31 for moving the discharge conveyor belt 29 at a faster rate of speed than the feed belt 18 allowing the strip to be quickly carried away from the cutting position so as to prevent the end thereof coming in contact with the end of the following strip of stock.

From the foregoing, it is obvious that I have provided an improved tire tread measuring and cutting machine having means for readily and quickly adjusting the feeding mechanism, and which machine is also provided with means for accurately indicating the predetermined length of strips the machine is set to cut from a continuous length of tread material.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a device of the character described, a stock feeding mechanism for feeding predetermined lengths of stock, cutting mechanism comprising a carriage arranged to be reciprocated traversely across said stock, upper and lower cutters secured to said carriage, rack gear mechanism operable by the movement of said carriage for intermittently rotating said upper cutter, drive means independent of said rack gear for rotating said lower cutter in synchronism with said upper cutter, and means for operating said carriage in timed relationship to said stock feeding mechanism.

2. In a device of the character described, a feeding mechanism for feeding predetermined lengths of stock, and a severing mechanism comprising a carriage arranged to be intermittently reciprocated traversely to said stock, a plurality of rotary cutters mounted on said carriage, said cutters being independently and intermittently rotated in synchronism with said carriage, and means for operating said carriage in timed relationship to said stock feeding mechanism.

3. In a machine for cutting sheet material into strips of given length, a feeding mechanism for feeding predetermined lengths of stock, severing mechanism comprising a cutting carriage for traversing the material and two independently and intermittently actuated rotary cutters mounted thereon, drive means for said feeding mechanism including a unitary clutch and brake mechanism, mutilated gear means for actuating said last mentioned means to a braking position, and means for operating said severing mechanism in timed relationship to said feeding mechanism.

4. In a device of the character described, a feeding mechanism for feeding predetermined lengths of stock, a severing mechanism comprising a cutter carriage traversing the stock, upper and lower rotary cutters secured to said carriage, said upper cutter being rotated by the traversing movement of said carriage, drive means for intermittently actuating said feeding mechanism, said drive means including a unitary clutch and brake mechanism, mutilated gear means for actuating said last mechanism, and a crank disc for actuating said gear means, said disc having means for actuating said lower cutter rotating mechanism in synchronism with said upper cutter, and means for operating said severing mechanism in timed relationship with said feeding mechanism.

5. In a device of the class described, a strip material feeding mechanism, cutter mechanism movable traversely of said strip material to shear the same into given lengths including cooperating cutters between which the said material is cut, means for traversing said cutter mechanism over said material, drive means intermittently connected to one of said cutters for actuating it independently of the traversing movement of said cutter mechanism but simultaneous therewith, and means actuated by the traversing movement of said cutter mechanism for actuating the other cutter.

6. In a device of the class described, a strip material feeding mechanism, cutter mechanism movable traversely of said strip material to shear the same into given lengths including cooperating cutters between which the said material is cut, means for traversing said cutter mechanism over said material, drive means connected to one of said cutters for actuating it independently of the traversing movement of said cutter mechanism, and means actuated by the traversing movement of said cutter mechanism for actuating the other cutter, said drive means including a rotatable shaft having gearing slidably disposed thereon and rotatable therewith to actuate the associated cutter.

7. In a device of the class described, a strip material feeding mechanism, cutter mechanism movable traversely of said strip material to shear the same into given lengths including cooperating cutters between which the said material is cut, means for traversing said cutter mechanism over said material, drive means intermittently connected to one of said cutters for actuating it independently of the traversing movement of said cutter mechanism but simultaneous therewith, and means actuated by the traversing movement of said cutter mechanism for actuating the other cutter, said latter means including a rack and pinion from which rotative motion is transmitted to the associated cutter upon said mechanism traversing said material.

8. In a device of the class described, a strip material feeding mechanism, cutter mechanism movable traversely of said strip material to shear the same into given lengths including cooperating cutters between which the said material is cut, means for traversing said cutter mechanism over said material, drive means connected to one of said cutters for actuating it independently of the traversing movement of said cutter mechanism, means actuated by the traversing movement of said cutter mechanism for actuating the other cutter, said drive means including a rotatable shaft having gearing slidably disposed thereon and rotatable therewith to actuate the associated cutter, and intermittently operated clutch controlled means for controlling the rotation of said shaft in timed relation to said stock feeding mechanism.

9. In a device of the class described, feeding mechanism operable to intermittently advance strip material to be cut into given lengths, cutter mechanism for traversing said material to cut it into given lengths, and adjustable means for varying the length of material advanced past said cutter mechanism to be cut thereby including manually operable planetary gearing and an indicia plate associated therewith for at all times indicating the length of strips which the device is set to cut.

In testimony whereof I have hereunto subscribed my name at Eau Claire, Eau Claire County, Wisconsin.

ARNOLD R. KRAUSE.